United States Patent [19]

Gilbert et al.

[11] Patent Number: 4,515,518
[45] Date of Patent: May 7, 1985

[54] TOWABLE, HYDRAULICALLY POWERED LIFTING AND TRANSPORT TRAILER

[75] Inventors: Jerry R. Gilbert; Robert C. Millikan, both of Macon; Charles H. Wysowski, Warner Robins; John R. Pyburn, Jr., Macon, all of Ga.

[73] Assignee: Brown & Williamson Tobacco Corporation, Louisville, Ky.

[21] Appl. No.: 501,578

[22] Filed: Jun. 6, 1983

[51] Int. Cl.³ .............................................. B60P 3/00
[52] U.S. Cl. .................................. 414/459; 280/43.23
[58] Field of Search ............... 414/458, 459, 498, 495, 414/608; 280/43.23

[56] References Cited

U.S. PATENT DOCUMENTS

| | | | |
|---|---|---|---|
| 2,547,269 | 4/1951 | Kinsey | 414/458 |
| 2,560,625 | 7/1951 | Boggs, Jr. et al. | 280/43.23 |
| 2,560,714 | 7/1951 | Bill | 280/43.23 |
| 2,636,746 | 4/1953 | Meldrum | 280/43.23 |
| 2,648,546 | 8/1953 | Falkenhagen | 280/43.23 |
| 2,774,606 | 12/1956 | Burweger et al. | 280/43.23 |
| 2,896,803 | 7/1959 | Clifton | 414/461 |
| 3,019,926 | 2/1962 | Christenson | 414/459 |
| 3,083,850 | 4/1963 | Owen | 414/458 |
| 3,381,833 | 5/1968 | Gordon | 414/459 |
| 3,501,039 | 3/1970 | Mitsuyasu | 414/458 |
| 3,513,999 | 5/1970 | Schwartz et al. | 414/460 |
| 3,520,429 | 7/1970 | Andersson | 414/458 X |
| 3,557,982 | 1/1971 | Henriksson et al. | 414/459 X |
| 3,631,999 | 1/1972 | Walerowski | 414/495 X |
| 3,861,545 | 1/1975 | Ellerd | 414/495 |
| 3,972,308 | 8/1976 | Ray | 280/43.23 |
| 4,003,583 | 1/1977 | Stanzel | 280/43.23 |
| 4,060,259 | 11/1977 | Mefford et al. | 280/43.23 |
| 4,076,137 | 2/1978 | Kucera | 414/495 X |

FOREIGN PATENT DOCUMENTS 363939  12/1957  Switzerland ........................ 414/608

Primary Examiner—Robert J. Spar
Assistant Examiner—Stuart J. Millman
Attorney, Agent, or Firm—Charles G. Lamb

[57] ABSTRACT

An improved transport assembly including a carriage and container arrangement which provides for moving a plurality of containers into several recesses of a moveable carriage frame and lifting the carriage frame for mass movement of the containers by the carriage frame.

2 Claims, 8 Drawing Figures

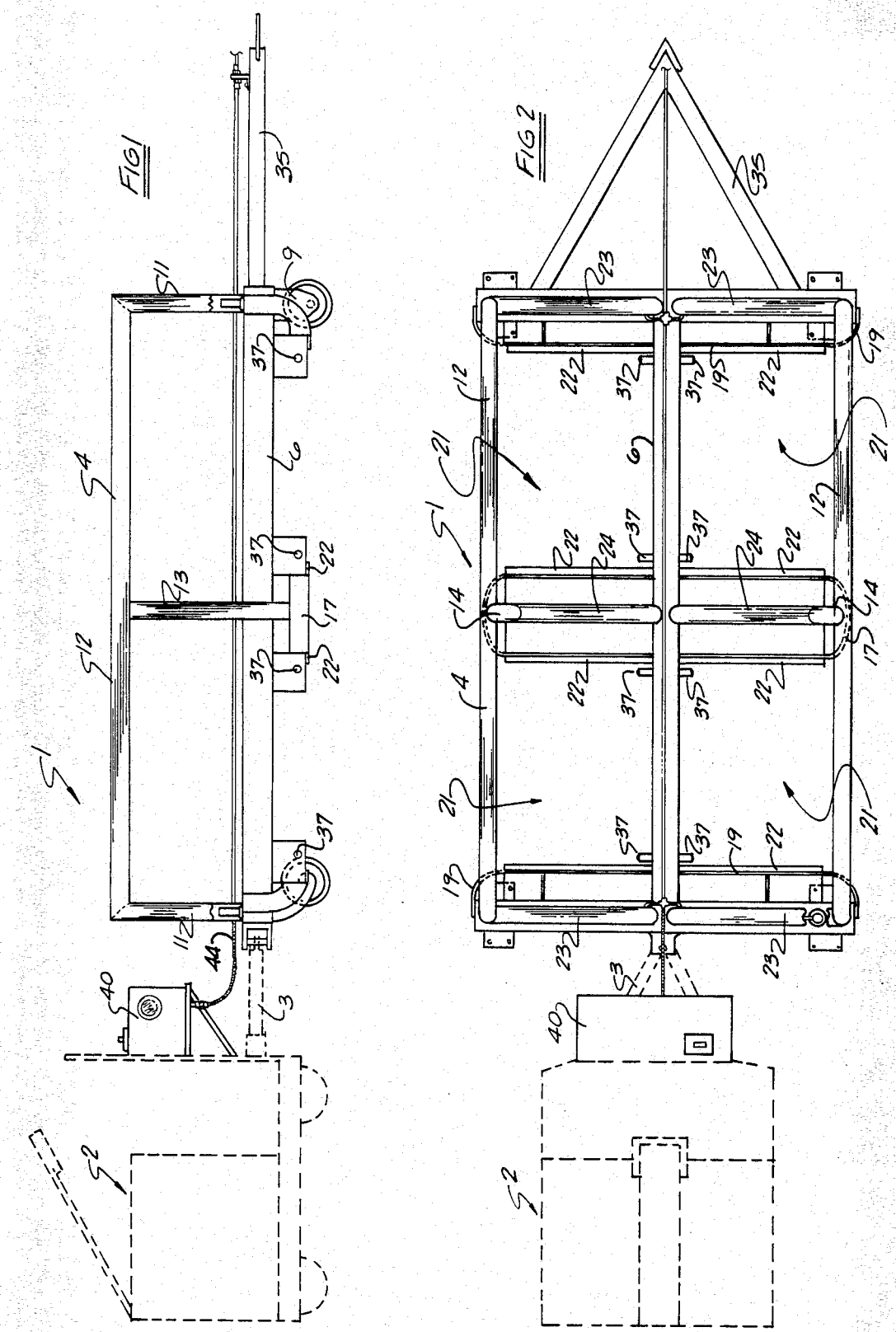

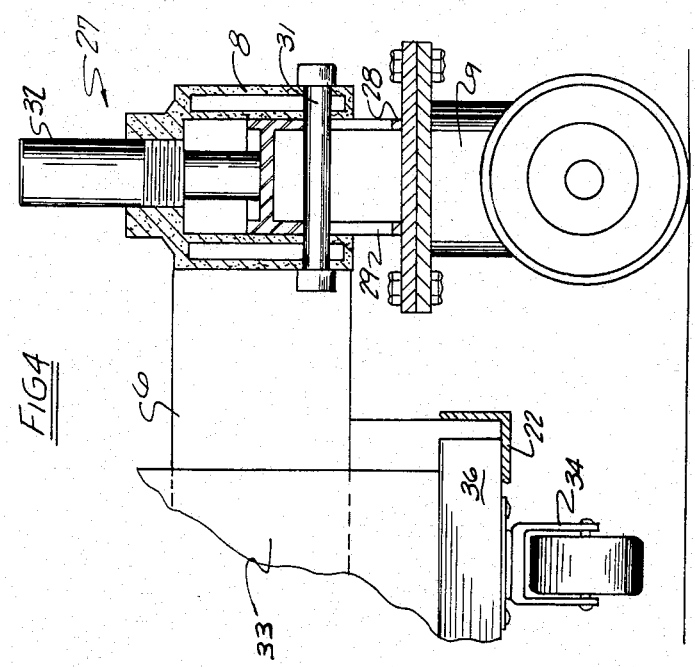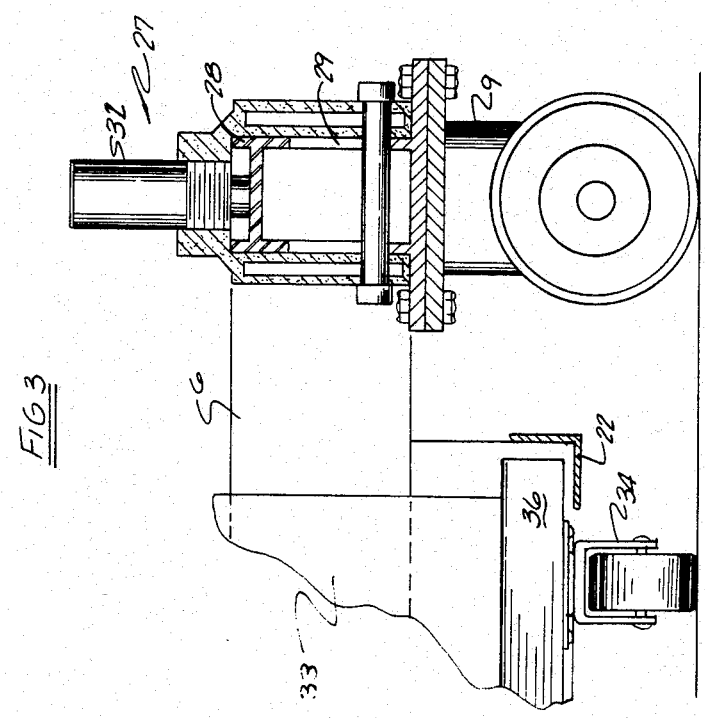

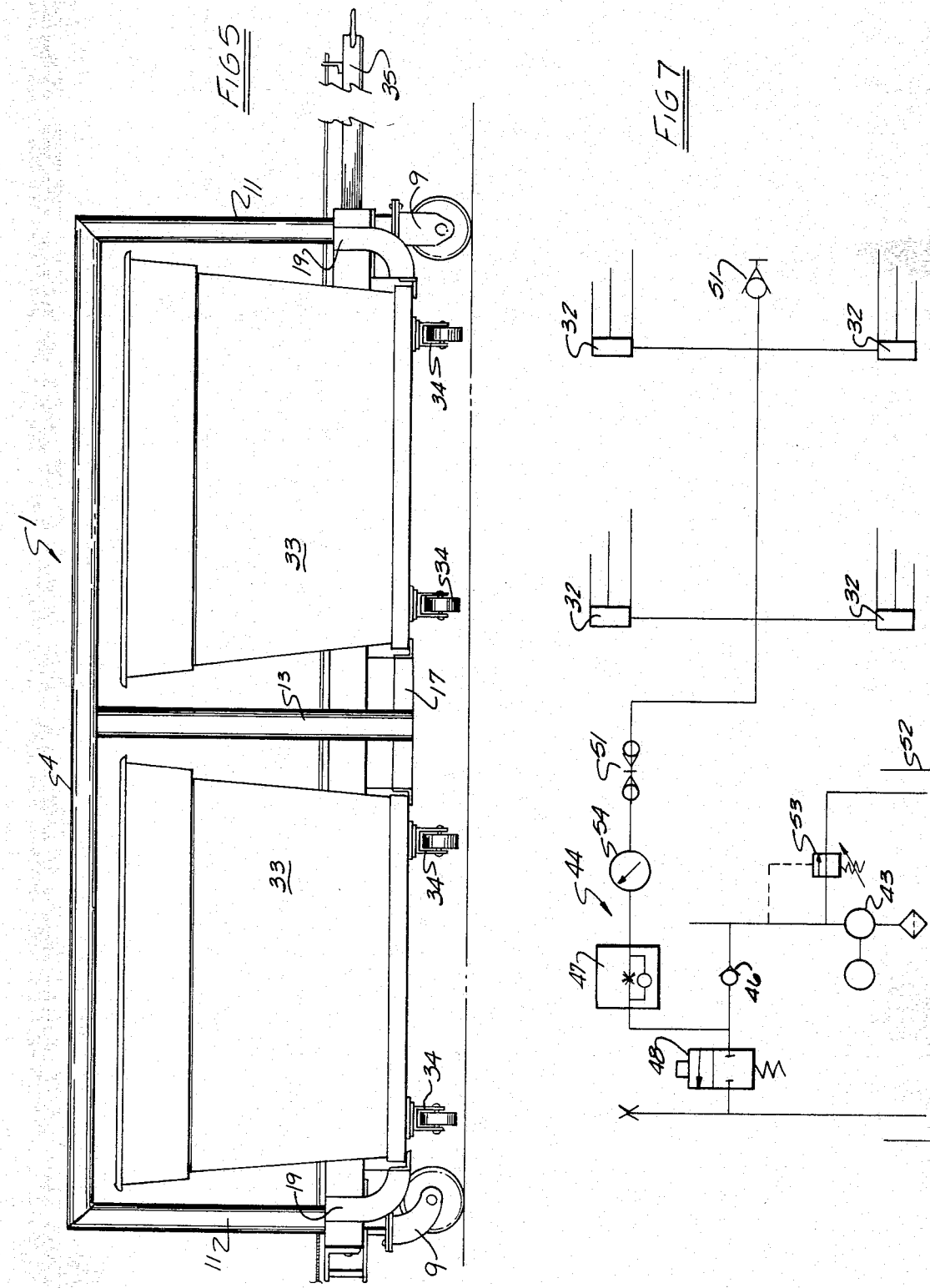

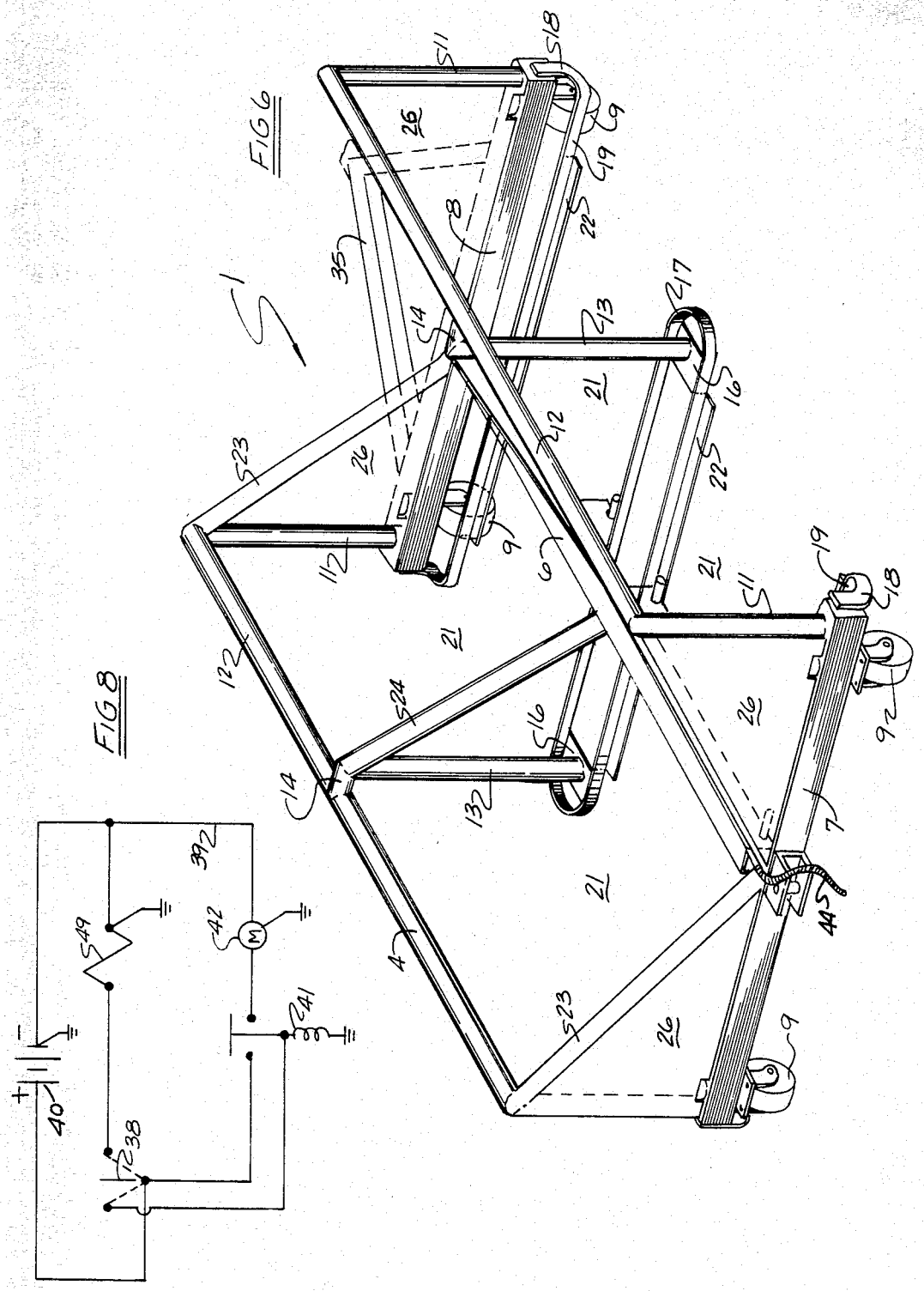

TOWABLE, HYDRAULICALLY POWERED LIFTING AND TRANSPORT TRAILER

BACKGROUND OF THE INVENTION

1. Field of the Invention

The present invention relates to an improved transport assembly and more particularly relates to an improved trailer or carriage and container arrangement which provides for ready assembly of a plurality of containers unto a carriage structure and lifting of the same for mass movement of such containers from one station to another.

2. Brief Description of the Prior Art

In the materials moving art, it has long been known to assemble large bulk items as a group unto a trailer and to move such trailer from one site or work station to another for additional processing or for disposal. Many of the bulk items to be moved require substantial manpower energy and present potential risks of injury in movement and loading unto the transport carriages, as well as requiring substantial time to accomplish the task with frequent risk of damage or injury to the material or personnel involved in loading. Various structures are known in the art of material handling for accomplishing the transport task. For example, in U.S. Pat. No. 3,631,999, issued to Reinhard Waleroski on Jan. 4, 1972, a transport device for moving large containers is disclosed which includes two entirely separate independent wheel mounted carriage units to allow carriage movement and positioning on opposite sides of the container to be moved, each carriage being provided with a separate cantilevered lifting arrangement to raise the container for transport. The more recent U.S. Pat. No. 4,076,137 issued to Joseph B. Kucera on Feb. 28, 1978, teaches a transport device for handling large bales including a pair of support ramps mounted on a carriage which ramps are moveable in a forward direction to straddle the lower sides of a bale, the ramps being lifted for bale transport and lowered for bale unloading. Other material lifting and moving trailers such as the straddle arrangements disclosed by long expired U.S. Pat. No. 2,896,803, issued to C. C. Clinton on July 26, 1959, and by more recent U.S. Pat. No. 3,513,999, issued to W. H. Schwartz et al on May 26, 1970, and the fork lifting arrangement of U.S. Pat. No. 3,861,545, issued to Charles J. Ellerd on Jan. 21, 1975, are known in the art but such trailers have been generally complex in their construction, operation and maintenance, have presented a number of protruding parts which could be damaging to both materials and operating personnel and have, in many instances, been limited to the specific article to be lifted and moved.

The present invention, recognizing these limitations of the prior art provides a carriage and container arrangement for lifting and transporting heavy containers in multiple numbers, in an organized and time saving operation, and with a minimum of manual energy and risk of injury to personnel and material. Concomitantly, the present invention provides an arrangement which allows for ready movement and manipulation of large containers in limited space and which allows for efficient movement of such containers in multiple numbers over extensive distances, optimizing the use of existing and supplementary container rolling equipment.

Various other features of the present invention will become obvious to one skilled in the art upon reading the disclosure set forth hereinafter.

SUMMARY OF THE INVENTION

More particularly the present invention provides a transport assembly arrangement comprising: moveable container means having horizontal support members extending outwardly from opposite sides thereof; a moveable carriage means having at least one container receiving recess therein sized to receive the container means; spaced opposed horizontal support members mounted on the carriage means along the walls of the recess to extend below the support members of the container means when the container means has been positioned in the recess of the carriage means; and means to vertically elevate the horizontal support members of the carriage means to engage the support members of the container means to lift the container means for movement with the carriage means.

It is to be understood that various changes can be made by one skilled in the art in arrangement, form and construction of the apparatus described herein without departing from the scope or spirit of the present invention.

BRIEF DESCRIPTION OF THE DRAWINGS

Referring to the drawings which disclose one advantageous embodiment of the present invention:

FIG. 1 is a side view of the novel transport assembly of the present invention, disclosing in phantom a tow vehicle connected thereto;

FIG. 2 is a top plan view of the assembly and tow vehicle of FIG. 1;

FIG. 3 is an enlarged fragmented cross-sectional side view of one of the lift assemblies above a carriage caster, disclosing the lift assembly in collapsed or retracted position with the adjacent container caster at floor level.

FIG. 4 is a view similar to that of FIG. 3, but disclosing the lift assembly in extended position with the adjacent container caster above floor level;

FIG. 5 is an enlarged side view of the trailer assembly of FIGS. 1–4 with containers disposed in the carriage recesses and lifted from floor level for towing;

FIG. 6 is an isometric view of the tow assembly of FIGS. 1–5;

FIG. 7 is a schematic view of the hydraulic circuit for the tow assembly of FIGS. 1–6, and, FIG. 8 discloses a schematic electrical circuit to operate the schematic hydraulic circuit of FIG. 7.

DETAILED DESCRIPTION OF THE INVENTION

Referring to FIGS. 1 and 2; the inventive transport assembly 1 is disclosed in coupled relation to tow truck 2 through coupler assembly 3, the truck 2 and coupler assembly 3 (shown in phantom) being conventional in the material handling art and not described in detail.

Referring to FIGS. 1, 2, 5 and 6, transport assembly 1 includes a longitudinally extending moveable carriage frame broadly referred to by reference numeral 4. As disclosed in the drawings (FIG. 6), carriage frame 4 includes a longitudinally extending lower central rib member 6 which determines the longitudinal axis of carriage frame 4. Fixed to and mounted at opposite ends of rib 6 in perpendicular fashion thereto to determine the ends of frame 4 are spaced, opposed structural end members 7 and 8, end members 7 and 8 and rib 6 forming an I-shaped lower carriage assembly. Fixed to the underside of the opposite extremities of each end member 7 and 8 is a caster 9, to thus provide a set of spaced casters, each caster of the set being located at one corner of carriage frame 4. To form the upper portion of carriage frame 4 and to enhance the structural stability and strength of the carriage frame, a set of four tubular vertical corner risers 11 is provided, with a riser 11 being positioned at each corner of frame 4 to rise vertically above a caster 9. A pair of horizontal, longitudinally extending spaced parallel side bars 12, which serve as transport assembly bumpers to protect containers or bins and which improve structural rigidity, are connected at their extremities to the upper extremities of risers 11 on each longitudinal side of carriage frame 4 to define the longitudinal side extremities of carriage frame 4.

Vertically suspended from the center of each longitudinal side bar 12 is a hanger bar 13, the upper extremity of each hanger bar 13 being turned at right angles to provide a stub 14 which in turn is fastened to the center portion of a side bar 12. A horizontal plate 16 is mounted at the lower extremity of each vertical hanger bar 13. Fastened to and supported from plates 16 is an eliptically shaped center guide 17. The aforedescribed hanger bar and support arrangement is so sized and positioned that center guide 17 extends transversely to and below central rib 6 of the I-shaped lower carriage assembly but above the floor on which casters 9 rest.

Fastened at the extremities of end members 7 and 8 of I-shaped lower carriage assembly are the up-turned side portions 18 of end guides 19. It is to be noted that end guides 19, which are in spaced opposed relation to the transverse sides of eliptical center guide 17, serve to define four container receiving recesses indicated in the drawings by arrows 21, (FIGS. 2,6). Each of guides 17 and 19 has extending therefrom in horizontal fashion along the peripheries of recesses 21 and above the lower plane of casters 9, rail support members 22. As will be described hereinafter, rail support members 22 are so positioned in spaced relation from the floor to extend below the support members of moveable containers when they have been moved into position in recesses 21. Advantageously, support members 22 are positioned at a slight incline to slope inwardly and downwardly toward central rib member 6 to better support and retain containers or bins described hereinafter.

To add to the structural stability of carriage frame 4 and to further define recesses 21, are the angularly disposed end struts 23 which are fixed to and extend downwardly and inwardly at an angle from the upper extremeties of vertical risers 11 to the side extremities of central rib 6 of the I-shaped lower carriage frame and the angularly disposed central struts 24 which are fixed to and extend downwardly and inwardly at an angle from the upper extremities of hanger bars 13 adjacent stub portion 14 to the sides of central rib 6 adjacent the center portion thereof.

As can be seen in FIG. 6, pairs of spaced opposed triangularly shaped gusset plates 26 are arranged to be fastened to end members 7 and 8, risers 11 and angled struts 23 to complete the opposite ends of upper carriage frame 4 adding to the strength of frame 4 without unduly increasing the weight thereof and to provide housings for the hydraulic lift system for the carriage frame 4—as described in detail hereafter.

Referring to FIGS. 3 and 4 of the drawings, the hydraulic lift system for the carriage frame 4 comprises vertically extensible and collapsible lift assemblies broadly designated by reference numeral 27, one portion of each lift assembly being connected to the central rib 6 of I-shaped lower carriage assembly of carriage frame 4 and another portion of lift assembly 27 being connected to one of the casters 9. To accomplish this, each end member 7 and 8 (only one extremity of end member 8 being disclosed in detail in FIGS. 3 and 4—it being understood that the other extremity of end member 8 and the extremities of end member 7 are similarly arranged) is hollowed to provide an outer housing of male sleeve member to receive an inner sleeve member 28. Inner sleeve 28 is provided with a pair of spaced opposed vertical slots 29 through which a pin 31 extends in horizontal fashion, the extremities of pin 31 being fastened to outer sleeve or end member 8. This arrangement serves to limit the relative travel of the inner and outer sleeves and to securely align the inner and outer sleeves.

To actuate the inner and outer sleeve members into extensible lifting position (FIG. 4) and collapsible position (FIG. 3) a set of hydraulically operated cylinders and pistons 32 are provided. Each hydraulic cylinder 32 is screw-threaded into outer sleeve or end member 7 and 8, at an extremity of the end member in substantial vertical alignment with a caster 9, to thus provide an arrangement which serves to distribute the weight of carriage frame 4 and containers 33 mounted in the recesses 21 evenly and directly through the set of casters 9 (FIG. 5).

As can be seen in FIGS. 3,4 and 5 which disclose bins or containers 33 inserted into the recesses 21 of carriage frame 4, each container 33 is moveable on a set of small casters 34 so to be easily and readily manually moveable in limited spaces at its workplace and to be readily insertable into a recess 21 of carriage frame 4 for movement with other containers 33 to a discharge area. Each container 33 is provided at its lower extremity with a horizontal support rim 36 which is so positioned and geometrically configured (FIG. 3) to permit, when cylinders 32 are in unextended position, the container's easy insertion into a recess 21 with support 36 of the container located slightly above opposed support members 22, positioned on the periphery of the recess 21 and mounted to carriage frame 4.

As can be seen in FIGS. 4 and 5, when frame 4 is elevated by extending the hydraulic pistons in the cylinder and piston 32 arrangement, support 22 engages support 36 to lift bin 33 from the floor for movement with carriage frame 4.

Referring to FIGS. 1 and 2 of the drawings, it is to be noted that each recess 21 is provided with a set of resilient rubber stops 37 mounted on the central rib 6 of the carriage frame 4 to extend adjacent the periphery of recess 21 to serve as a bumper when a container 33 is inserted into recess 21. It is to be understood that the structure described can be made of any suitable material such as steel or aluminum and that several carriage frames can be linked by a suitable hitch 35 fastened to frame 4 at the end thereof.

Referring to FIGS. 7 and 8, which schematically disclose the hydraulic and electric circuitry respectively for operating the novel transport assembly an operator moves toggle switch 38 of electrical circuit 39, (which toggle switch 38 has a "Raise", "Lower" and "Neutral" position and is spring returnable to "Neutral"

position) from "Neutral" position to "Raise" position and holds. Toggle switch 38 when moved to "Raise" position energizes solenoid switch 41 through D.C. battery 40 located on tow vehicle 2 (FIGS. 1 and 2) to closed position. Solenoid switch 41 in closed position activates motor 42 in circuit 39 and hydraulic pump 43 in hydraulic circuit 44 causing hydraulic fluid to flow through check valve 46, through adjustable flow control valve 47, and connected quick disconnects 51 to extend hydraulic cylinders 32, which raises carriage frame 4 and containers 33. When hydraulic cylinders 32 are fully extended, operator releases toggle switch 38, which being spring loaded, returns to "Neutral" position. The toggle switch 38, being in neutral position returns solenoid switch 41 to normally open condition stopping motor 42 and hydraulic pump 43. Pressure will remain in the extend mode of the hydraulic circuit because check valve 46 allows flow in only one direction. It should be noted at this point in the cycle, that the 2-way valve 48 will allow no flow since it is in a "normally closed" position. Also, note that the adjustable flow control valve 47 does not regulate flow when hydraulic fluid is pumped to the hydraulic cylinders 32. The purpose of the adjustable flow control valve 47 will be explained in the description of the lowering portion of the cycle.

To lower the carriage frame 4 and containers 33, the operator moves toggle switch 38 from "Neutral" position to "Lower" position and holds. Toggle switch 38, when moved to "Lower" position, energizes solenoid switch 49 (FIG. 8) which in turn activates 2-way valve 48, (FIG. 7) moving the ports to the open position allowing flow through 2-way valve 48. The weight of carriage frame 4 and containers 33 forces the hydraulic cylinders 32 to return to the retracted position forcing the hydraulic fluid back through the quick disconnects 51, adjustable flow control valve 47, and 2-way valve 48 to the hydraulic fluid reservoir 52. As the hydraulic fluid flows back to the reservoir 52, the carriage frame 4 and containers 33 return to the lowered position. When the carriage frame 4 and containers 33 have returned to the lowered position, the operator releases the toggle switch 38 returning it to the neutral position, thereby, deactivating solenoid switch 49 which in turn allows 2-way valve 48 to return to normally closed position. This completes a full raising and lowering cycle.

To explain the purpose of the adjustable flow control valve 47, it was found during the lowering process the carriage frame 4 tended to return from the raised position to the lowered position at a faster rate than was desired. To eliminate this condition, the adjustable flow control valve 47 was installed in the circuit to allow only a controlled amount of fluid to pass through the valve when fluid is returning to the reservoir 52. The fluid flow is not regulated through valve 47 when flowing to the hydraulic cylinders 32.

It is to be understood that hydraulic circuit 44 includes a conventional valve 53 located physically inside the pump itself and consists of a spring loaded, adjustable, 2-way valve. This conventional arrangement gives the capability of presetting or changing the pressure, advantageously maintained at about 700 psi, to be delivered by the hydraulic pump 43. By observing the pressure reading on the pressure gauge 54 when the pump has extended the hydraulic cylinders 32 to the fully extended position, the pressure can be set to any desired pressure within the pressure range of the hydraulic pump 43 by adjusting a set screw located on the hydraulic pump 43.

It also is to be understood that quick disconnects 51 with checks when not connected, allows no fluid flow through the quick disconnect. This allows the use of either one trailer or a series of trailers by allowing no fluid flow through the last quick disconnect in a train of trailers.

From the above described it can be seen that a novel transport assembly is provided which can utilize existing containers, eliminating the need for their manual lifting after loading with concomitant risk of injury to person and goods, allowing mass movement of a number of containers by utilizing multiple numbers of carriage assemblies linked together providing the saving of time, manpower and injury avoidance.

The invention claimed is:

1. A transport assembly arrangement comprising: a plurality of caster mounted containers, each having horizontal support members extending outwardly from opposite sides thereof at a position spaced from the bottom plane thereof; a longitudinally extending movable carriage frame having a longitudinally extending lower central rib member located on the longitudinal axis of the carriage frame, two elongated structural end members each one of which is located at the opposite ends of the lower central rib member disposed symmetrically and transversely to the lower central rib member, and an elongated center guide disposed symmetrically and transversely to the lower center rib in parallel relationship to and equally spaced from the structural end members; the central rib member, structural end members and center guide mutually cooperating to define a plurality of recesses extending along opposite sides of the longitudinal axis thereof and open to the longitudinal sides of the carriage frame, each recess being sized to receive one of said containers moved from stations located on opposite sides of the line of movement of said carriage frame; horizontal rail support members extending along the elongated structural end members and projecting inwardly of the adjacent recess toward the center guide and two horizontal support members extending along the central rib member on opposite longitudinal sides thereof and projecting inwardly of the adjacent recess toward the rail support member to the opposite side of the recess therefrom so that each of said recesses has spaced opposed elongated rail support members mounted on said carriage frame along the longitudinal sides of each said recess sloping downwardly in a direction toward the central rib member and positioned to extend below said support members of one of said containers when positioned in said recess; a set of spaced casters, each of said casters being disposed at the free end of each one of the horizontal support members such that a caster is located at each corner of said carriage frame; a pair of horizontal, longitudinally extending spaced parallel side bars located to each longitudinal side of the lower center rib, each side bar being located above the free ends of the rail support members and center guide by a distance greater than the height of the container; a vertical corner riser extending from each free end of each horizontal support member to said side bar located thereabove to support said horizontal support member, and a vertical hanger bar extending from each free end of said center guide to said side bar located thereabove to support said horizontal support member; a set of vertically extensible and collapsible lift assemblies, one for each caster including inner and outer telescoping sleeves, one of which sleeves is connected to the free end of each of said horizontal support members of said carriage frame and the other to one of said casters; an hydraulic system to simultaneously activate said lift assemblies, including a set of hydraulically operated cylinders and pistons, each of said pistons cooperating with one end of each of said vertically extensible and collapsible lift assemblies to simultaneously extend and collapse the same; and a set of resilient stops mounted to said lower central rib member to extend into each of said recesses to cushion the bump of a container inserted in said recess.

2. The apparatus of claim 1, each of said inner sleeves having a pair of opposed vertical slots disposed therein; a pin member extending horizontally through said slots with its opposite extremities fastened to said outer sleeve to limit the relative travel of said inner and outer sleeves.

* * * * *